D. FORD.
Vehicle-Seat.

No. 168,386.

Patented Oct. 5, 1875.

WITNESSES:
J. B. Smith
John Ford

INVENTOR:
David Ford

UNITED STATES PATENT OFFICE.

DAVID FORD, OF MILWAUKEE, WISCONSIN.

IMPROVEMENT IN VEHICLE-SEATS.

Specification forming part of Letters Patent No. 168,386, dated October 5, 1875; application filed May 15, 1875.

*To all whom it may concern:*

Be it known that I, DAVID FORD, of Milwaukee, in the county of Milwaukee, in the State of Wisconsin, have invented certain Improvements in Buggy-Seats, of which the following is a specification:

My invention is a buggy seat and body so arranged that the forward seat, which is on the front part of the body, may be tipped forward, and the latches which hold the ends of it in place pushed back and the ends of the seat turned down, so that the seat can be tipped back into the buggy-body, and the back seat slipped forward and fastened in its place, thus making a one-seated buggy out of a two-seated buggy.

Figure 1:
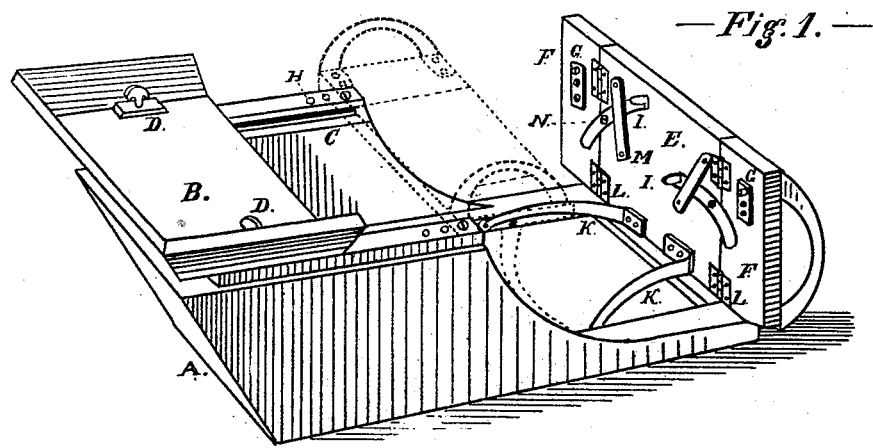
Figure 2:
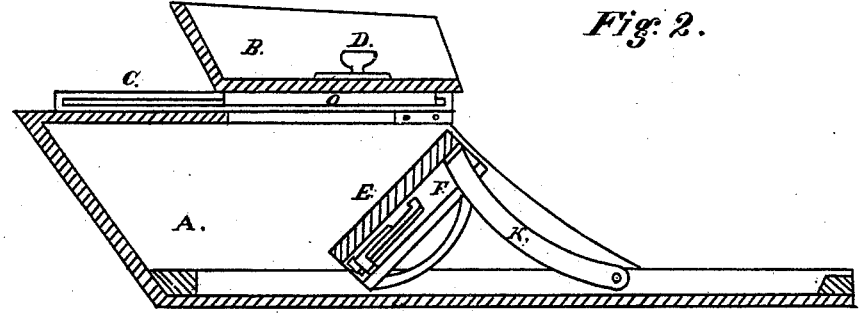

Figure 1 is a view of the buggy-body with the hind seat in its place, the front seat tipped forward in position to have the ends of the seat turned down preparatory to being turned back into the body of the buggy, and the front seat shown by dotted lines in its place; and Fig. 2, a side sectional view of the buggy-body, with the front seat turned back into the body and the back seat moved forward, occupying the place of the front seat.

A is the buggy-body; B, the hind seat; C, the groove in the tail of the buggy-body for the slide in the back seat to move in; D D, screw-bolts which secure the hind seat in place; E, the main center body of the forward seat; F F, the ends of the forward seat, secured to same by hinges; G G, pivots on the ends of the forward seat, which fit in holes in the rail of the buggy-body, to hold the seat when in place; H, holes for screw-bolts D D; I I, latches which hold the ends of the forward seat out in place; K K, swing-supports to the forward seat, their lower ends secured to the bottom frame of the buggy-body and their tops to the seat, so that the seat may be swung forward and back; L, hinges by which the end pieces F are secured to the seat E; M, keepers over the latches I I; N, screws through latches I, and on which they turn; O, the slides on the back seat, with a projection on them which fits into and slides in grooves C, and holds seat B in place.

The operation is as follows: When both seats are in position, to make a one-seated buggy, swing seat E forward, as shown, Fig. 1; turn the catch I back so that the ends of the catch shall be swung onto the seat E; then turn the ends F back, and then turn the seat back to the position shown, Fig. 2, and unscrew the screw-bolts D, and slide the back seat forward, and screw the screw-bolts down into the holes, as shown, Fig. 2, and a one-seated buggy is made; and, to make a two-seated buggy, reverse the motions as described for making a one-seated buggy, and the work is done. The main object of this arrangement is in keeping the forward seat, by means of the hinged ends, as wide as the back seat.

I claim as my invention—

A buggy-seat with hinged ends, latches I I, and pivoted supports K K, bent inward to allow the ends of the seat to swing under sufficiently to tip into the body of the buggy, and forward to permit of persons stepping into the carriage.

DAVID FORD.

Witnesses:
J. B. SMITH,
JOHN FORD.